(12) United States Patent
Stradiot

(10) Patent No.: US 11,490,592 B1
(45) Date of Patent: Nov. 8, 2022

(54) ANIMAL DRINKING POST

(71) Applicant: Michael John Stradiot, Evergreen, CO (US)

(72) Inventor: Michael John Stradiot, Evergreen, CO (US)

( * ) Notice: Subject to any disclaimer, the term of this patent is extended or adjusted under 35 U.S.C. 154(b) by 475 days.

(21) Appl. No.: 16/423,703

(22) Filed: May 28, 2019

(51) Int. Cl.
*A01K 7/06* (2006.01)
*F16K 31/44* (2006.01)

(52) U.S. Cl.
CPC .............. *A01K 7/06* (2013.01); *F16K 31/44* (2013.01)

(58) Field of Classification Search
CPC ... A01K 7/06; A01K 7/00; A01K 7/02; A01K 39/02; E03B 9/20; F16K 31/44
See application file for complete search history.

(56) References Cited

U.S. PATENT DOCUMENTS

| | | | | |
|---|---|---|---|---|
| 2,762,333 A * | 9/1956 | Smith | ...................... | A01K 7/02 119/81 |
| 3,831,558 A * | 8/1974 | Forbes | ..................... | A01K 7/06 119/73 |
| 8,607,737 B2 * | 12/2013 | Forbes | ..................... | A01K 7/06 119/73 |
| 2013/0160714 A1 * | 6/2013 | Forbes | ..................... | A01K 7/06 119/74 |

* cited by examiner

*Primary Examiner* — Kristen C Hayes
(74) *Attorney, Agent, or Firm* — Scott D. Swanson

(57) ABSTRACT

An intake valve and a drain system are located in the lower portion of a stanchion or outer pipe which is preferably dimensioned so that these structures can be located below the frost line underground so as not to be subject to freezing. The intake valve structure includes a body which fits tightly within the stanchion and which has a central bore which receives, at its uppermost end, the lower end of the conduit. The lower end of the bore is fitted with threads or other convenient means for connecting a conduit representing a source of water which is under sufficient pressure to allow the water to rise in the stanchion conduit and fill the basin. The improvements to the prior art include a stand or stabilizing means to secure the city water vertical outlet port at least about four to six inches above the bottom of the outer pipe. This facilitates removal of the intake valve structure from the city water outlet port. Other improvements include a reinforced pivot axis on the flapper, training and raised flappers, and ribs inside the bowl to assist unscrewing the intake valve structure.

14 Claims, 13 Drawing Sheets

ANIMAL DRINKING POST

THE FIELD OF THE PRESENT INVENTION

The present invention relates to improvements to a prior art animal watering fountain disclosed in U.S. Pat. No. 3,831,558 to Alden O. Forbes issued Aug. 27, 1974.

BACKGROUND

U.S. Pat. No. 3,831,558 improved the domestic animal trough by providing an elevated drinking fountain that a horse could learn to trigger. The '558 device was comprised of a PVC pipe standing about four feet high. The base was buried several feet below the frost line. Preferably a leech field was formed under the pipe using gravel. FIGS. 1 and 2 herein disclose the '558 invention. Advantages over the prior art trough included no algae since it uses (city) water released by the animal's nose into a bowl which drains after use, no electricity, ease of installation, no cement pad, and freeze prevention includes placing water line and release valve below frost line.

However, problems included drain water covering the release valve causing drainage blockage and freezing at the bowl, difficulty removing and re-installing the valve assembly conduit after maintenance onto the underground (two to seven feet feet) water line threads, and broken flappers.

The present invention solves these problems of the '558 patent.

SUMMARY OF THE INVENTION

The main aspect of the present invention is to provide a stand at the base of the PVC outer pipe which the (city) water outlet is substantially supported above the leech field.

Another aspect of the present invention is to provide an embodiment that provides an elevated crossbar to stabilize the city water outlet above the leech fields.

Another aspect of the present invention is to provide an embodiment of a lower block that stabilizes the city water outlet centrally in the PVC pipe.

Another aspect of the present invention is to add ribs inside the bowl to facilitate unscrewing the valve conduit assembly.

Another aspect of the present invention is to redesign and strengthen the flapper.

Another aspect of the present invention is to offer training flapper embodiments.

A method to provide an above ground fountain for an animal, the method comprising the steps of:
digging a hole in the ground: laying a leech field at a bottom of the hole;
laying water supply pipe on a top of the leech field;
forming an outer pipe having a selected height from the top of the leech filed to an animal activation point above ground;
installing a fountain bowl with an animal activation paddle at a top of the outer pipe; installing an activation rod inside a water supply pipe connected to the fountain bowl;
installing a conduit around the water supply pipe;
installing a supply valve and housing at a bottom of the conduit;
installing a stand at a bottom of the outer pipe;
installing a feeder pipe connected to the bottom of the water supply pipe through the stand down to an elbow;
placing the outer pipe on top of the leech field;
installing a horizontal extension pipe through an opening in the outer pipe to connect the elbow to the water supply pipe; and
filling the hole.

Other aspects of this invention will appear from the following description and appended claims, reference being made to the accompanying drawings forming a part of this specification wherein like reference characters designate corresponding parts in the several views.

In operation the same installation hole is dug. An elbow is installed to lift the (city) water exit port, a male threaded pipe, about six to twelve inches above the bottom of the PVC outer pipe. A stand with a central pipe guide is placed over the (city) water exit port. This presents drain water from surrounding the (city) water valve at the bottom of the valve conduit assembly. This stand also facilitates an easy re-threading of the bottom of the valve conduit assembly onto the (city) water threaded outlet pipe. Improved training paddles and short nosed animal paddles are provided.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
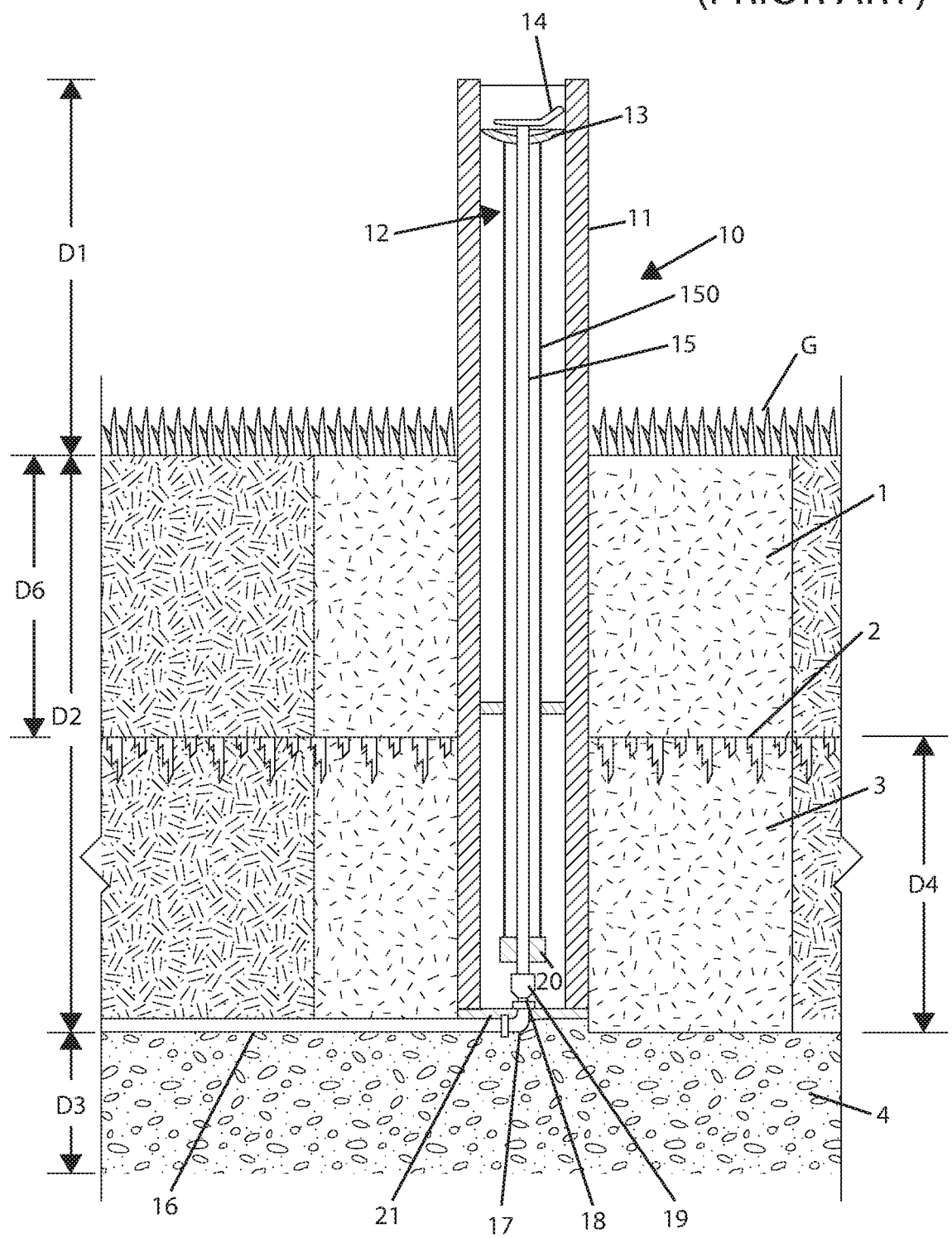
FIG. 1(prior art) is a sectional view of the invention of U.S. Pat. No. 3,831,558 installed below the frost line.
Figure 2:
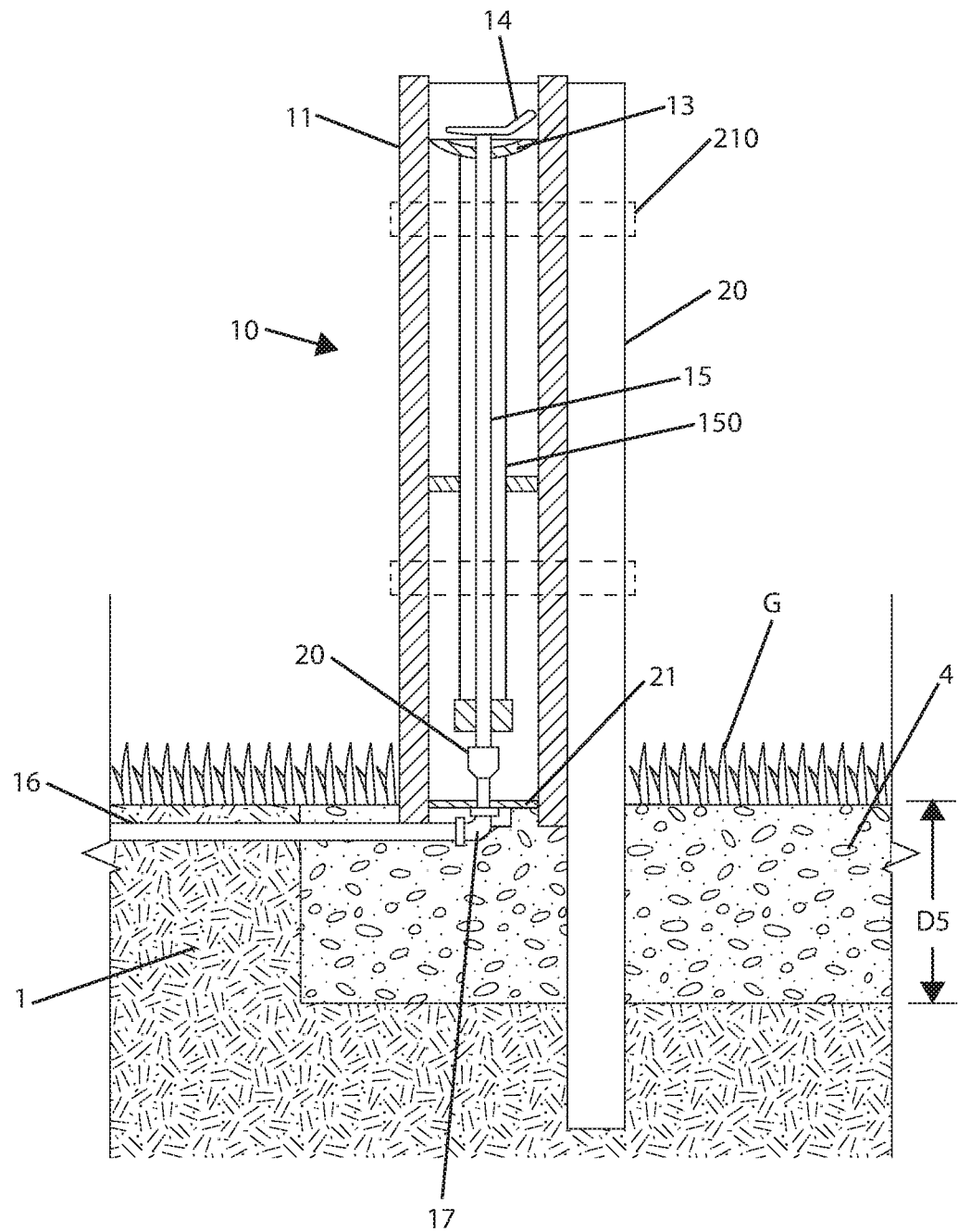
FIG. 2(prior art) is a sectional view of the invention of '558 installed for warm weather only use.

Referring first to FIGS. 1,2 topsoil layer 1 may have grass G. based on geography a frost line 2 exists a distance D5 below the surface. Topsoil layer 3 is dug a distance D4 (at least 18 inches) below the frost line 2. A leech field (gravel) 4 is preferably laid under topsoil layer 3 to drain away the spillage from the fountain 10. Nominal dimensions are D1=1-3 feet, D2=3-7 feet, D3=1 foot, D4=at least 18 inches, D6=at least 18 inches.

The fountain 10 has an outer (PVC) pipe 11. The valve assembly 12 comprises a bowl 13, paddle 14, and a conduit 15 that sends the water from (city) water pipe 16 to the bowl 13. At the base of outer pipe 11 is a (city) water elbow 17, a (city) water male threaded outlet port 18, and a female threaded inlet 19 in a housing 20. When the valve assembly 12 is removed for maintenance, the conduit 15 is rotated which unscrews the female threaded inlet 19 from the male threaded outlet port 18. Lower plate 21 allows the outlet port 18 to wobble. Thus, it is difficult to reinstall the female threaded inlet 19 onto the male threaded outlet port 18. Also ground water and spillage can linger over the threaded outlet port 18. This can cause a drainage blockage above the frost line 2 which can result in water freezing and damage or more spillage.

In FIG. 2 a summer only installation is shown. A support post 20 with straps 210 helps prevent an animal from dislodging the fountain 10. Nominal dimension D5 is at least 18 inches.

Figure 3:
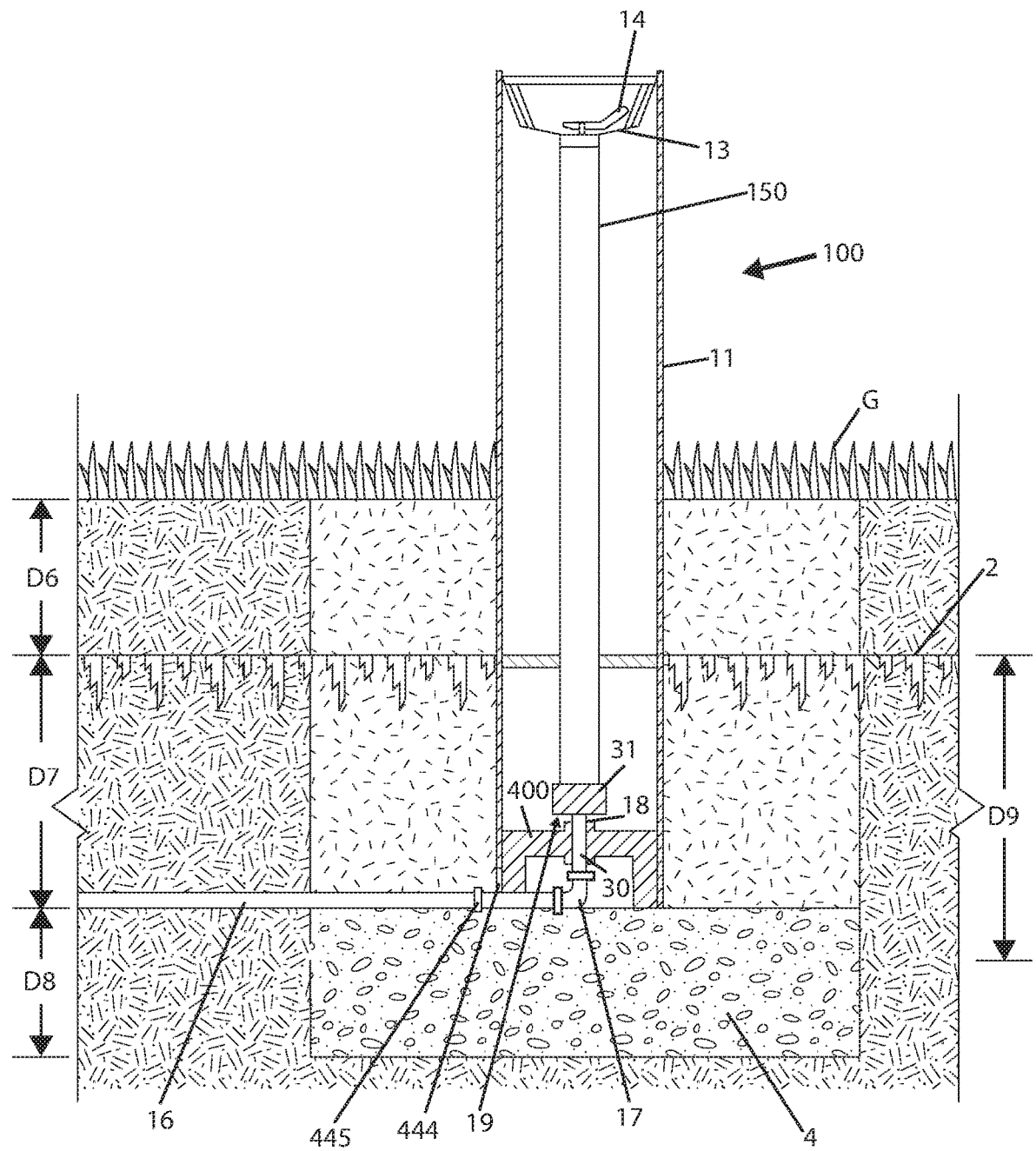
FIG. 3 is a sectional view of the embodiment of the present invention installed below the frost line.

Referring next to FIG. 3 a fountain 100 functions the same as fountain 10. However, the lower valve assembly 31 is now raised at least about two to six inches over the bottom of outer pipe 11. The city water pipe extension 30 has the male threaded outlet port 18. It threads into the female threaded inlet 19. A guide plate 33 has a central hole 34 to stabilize pipe extension 30. Fasteners 35 secure the guide plate 33 to the outer pipe 11. This design helps prevent ground water from settling around lower valve assembly 31, and it stabilizes the male threaded outlet port 18 facilitating maintenance.

Figure 4A:
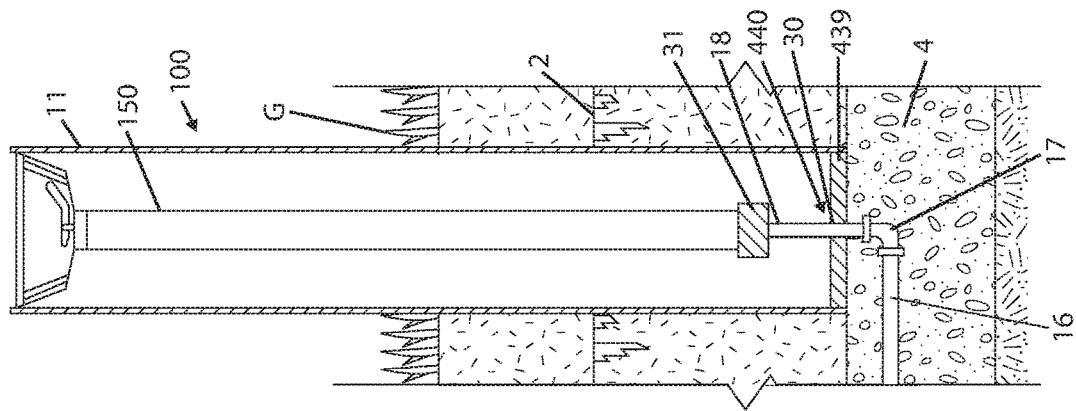
FIG. 4A is a sectional view of the stand embodiment of the present invention.

Referring next to FIG. 4A the lower valve assembly 31 is again raised at least about two to six inches over the bottom of outer pipe 11. The stand 400 has a guide hole 401 for pipe extension 30. See FIGS. 12-15 for details.

Figure 4B:
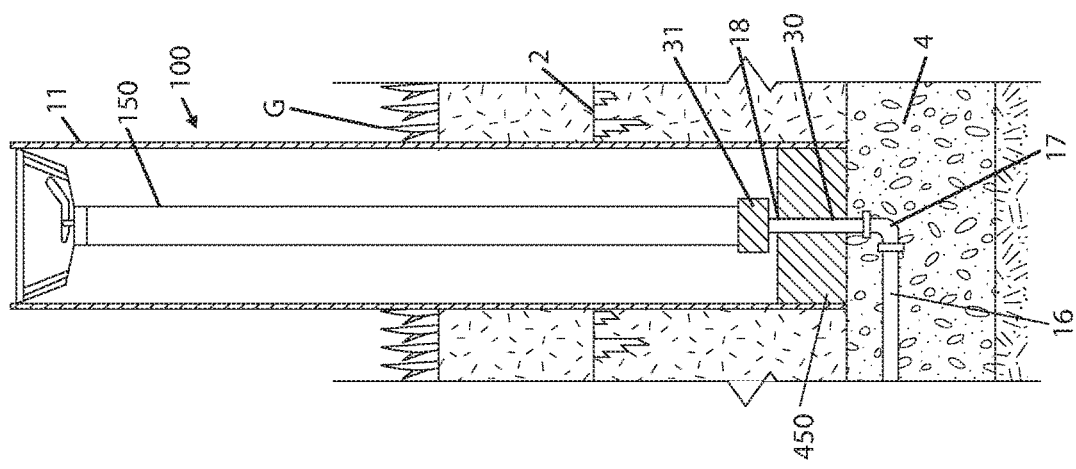
FIG. 4B is a sectional view of the block embodiment of the present invention.

Referring next to FIG. 4B the lower valve assembly 31 is again raised at least about two to six inches over the bottom of outer pipe 11. The block 450 has a central hole 451 for extension pipe 30. The block 450 could be made of plastic, wood, cement or the like. It should not rust.

Figure 4C:
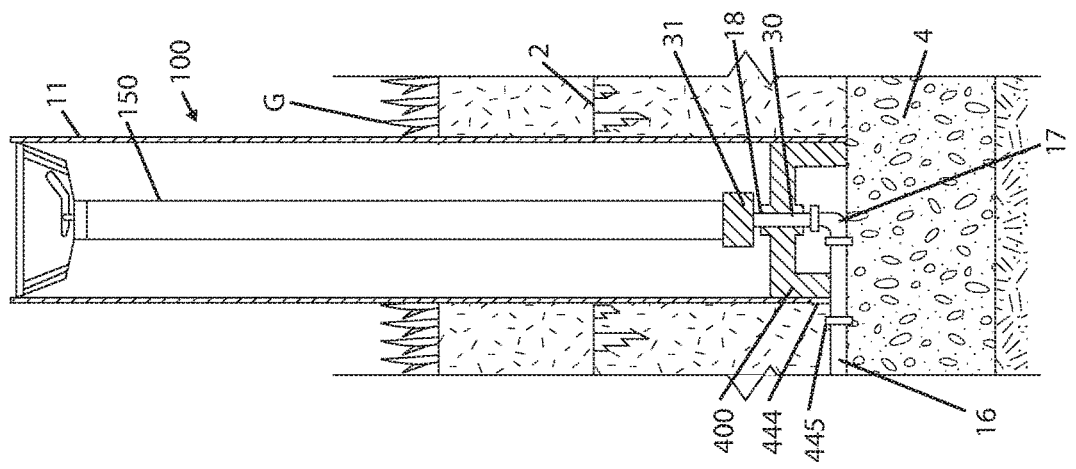
FIG. 4C is a sectional view of the raised pipe with plate embodiment of the present invention.

Referring next to FIG. 4C the lower valve assembly 31 is again raised at least about two to six inches over the bottom of outer pipe 11. The plate 439 has central hole 440. However, this is not a preferred embodiment because the male threaded outlet port 18 tends to wobble when the lower valve assembly 31 is attempted to be reinstalled.

Figure 4D:
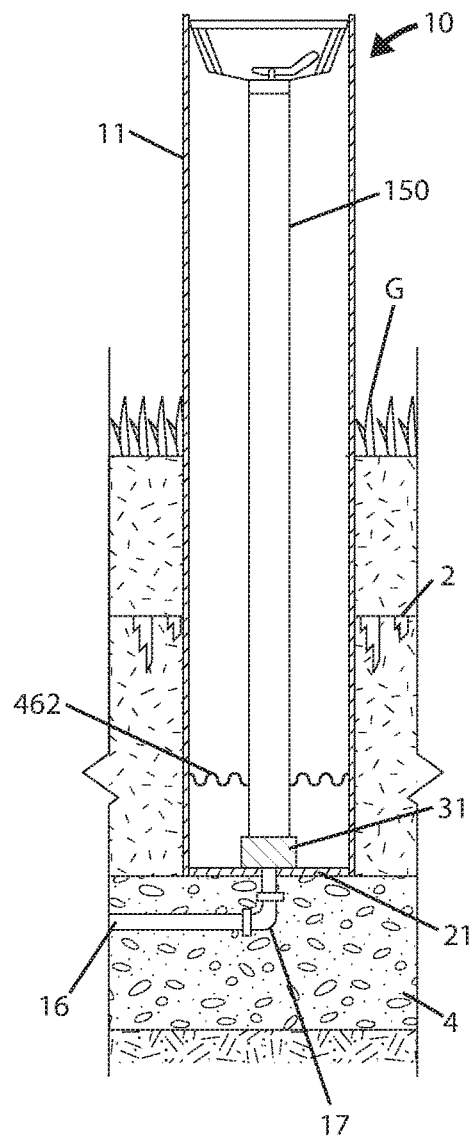
FIG. 4D (prior art) is a sectional view of a low pipe with plate embodiment.

Referring next to FIG. 4D (prior art) the plate 21 is on the bottom of outer pipe 11. The fountain 10 has the lower valve assembly 31 adjacent the plate 21. Ground water 462 has settled over the lower valve assembly 31.

Figure 5:
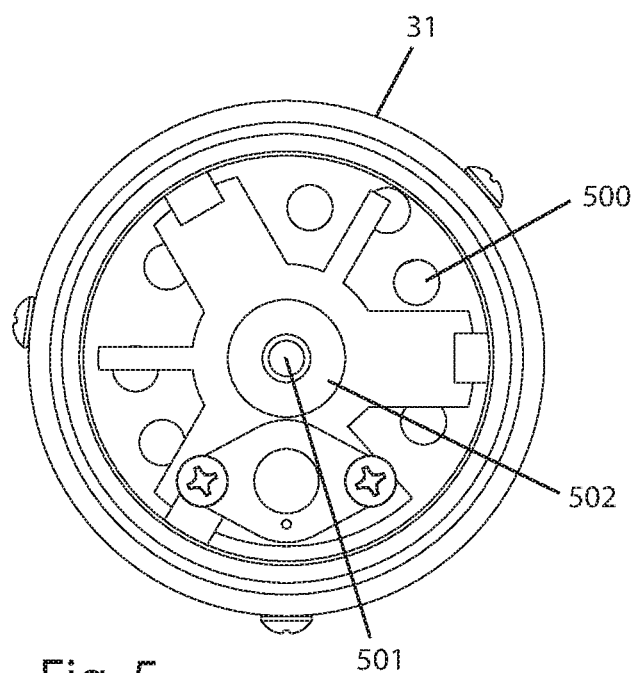
FIG. 5 (prior art) is a top plan view of the valve assembly.
Figure 6:
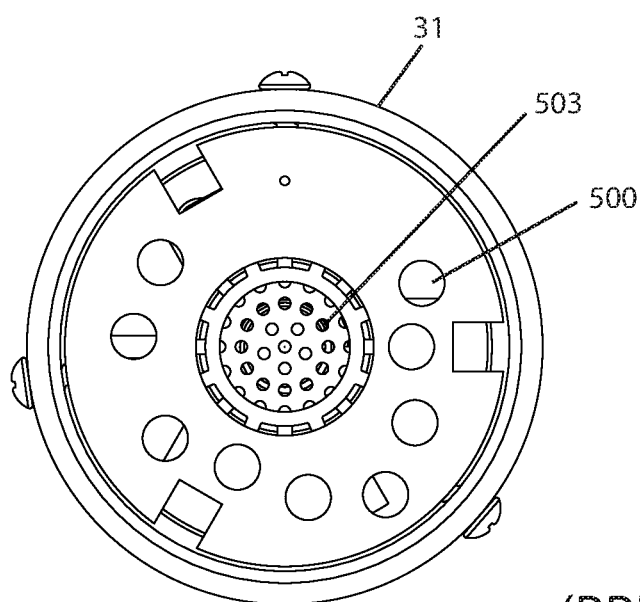
FIG. 6(prior art) is bottom plan view of the vale assembly.

Referring next to FIG. 5 (prior art) the top plan view of lower valve assembly 31 is shown to have drainage holes 500 for bowl overflow water. The central activation rod 501 is pressed down by flapper 14 to open the valve and release (city) water up conduit 502. In FIG. 6 (prior art) a city water filter 503 can require cleaning.

Figure 7:
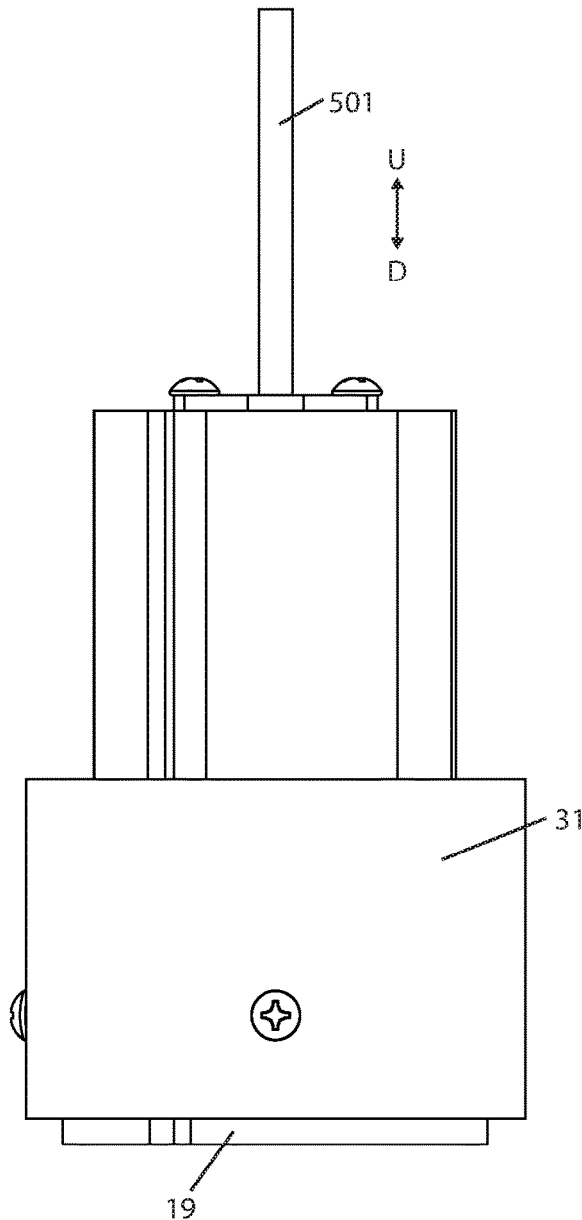
FIG. 7(prior art) is a side elevation view of the valve assembly.

In FIG. 7 (prior art) the activation rod 501 moves up U and down D.

Figure 8:
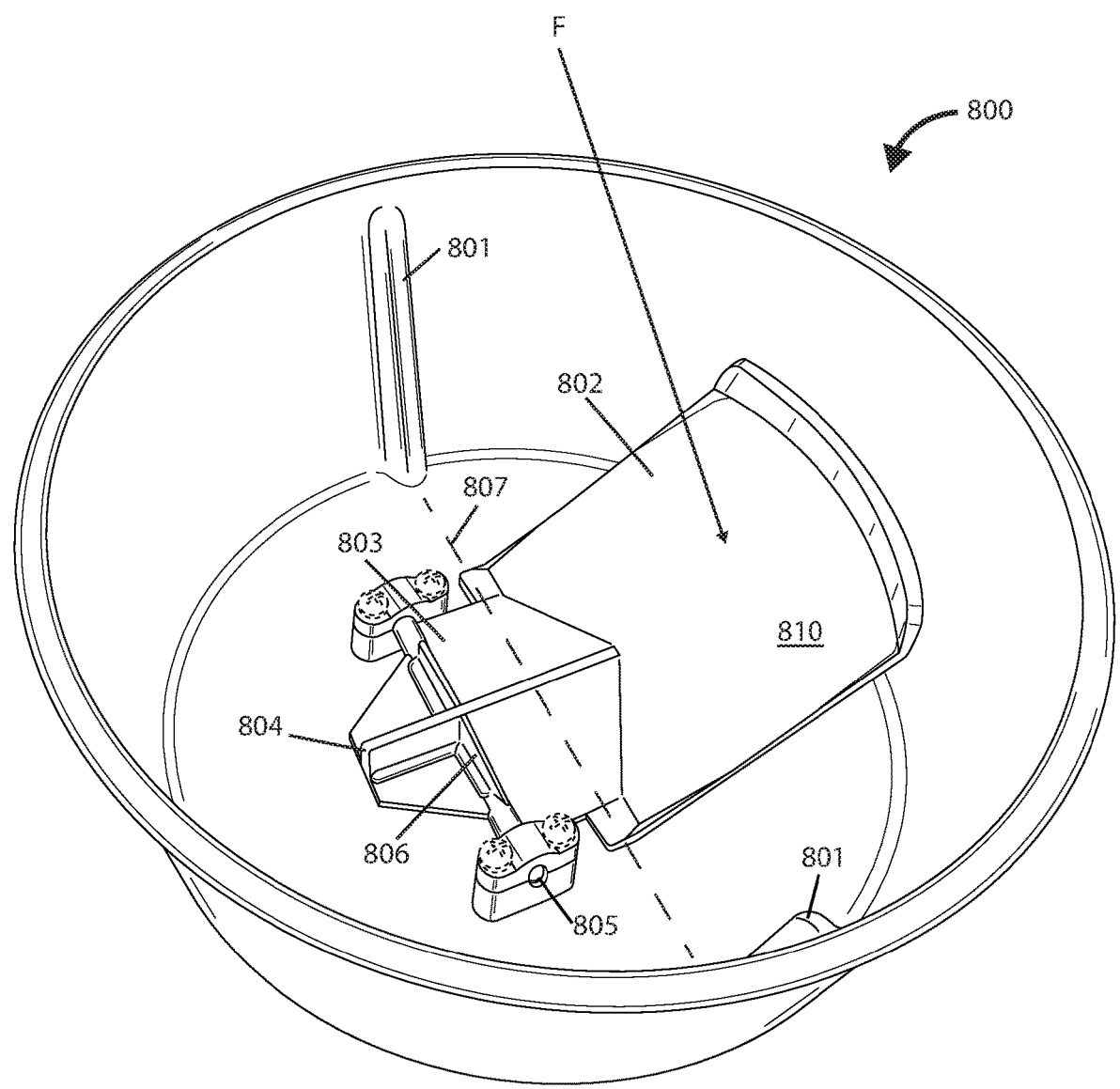
FIG. 8 is a top perspective view of the new bowl and new paddle (flapper).

Referring next to FIG. 8 a bowl 800 has inside vertical ribs 801 which help the user to unscrew the valve assembly for maintenance. The flapper 802 is new and non-obvious having a triangular buildup 803 with a maximum thickness centerline 804. The pivot arms 805 and axle 806 are supported by the buildup 803. The joinder line 807 in the prior art flapper was prone to break from the animal's force F on the tongue 810 of the flapper 802. The present embodiment prevents that breakage with buildup 803.

Figure 9:
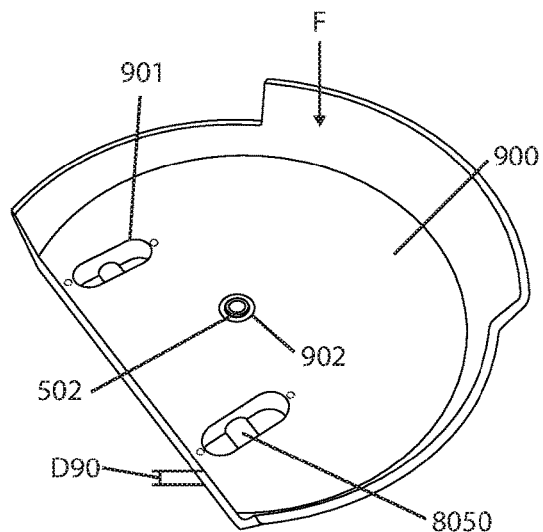
FIG. 9 is a top perspective view of an improved paddle.
Figure 12:
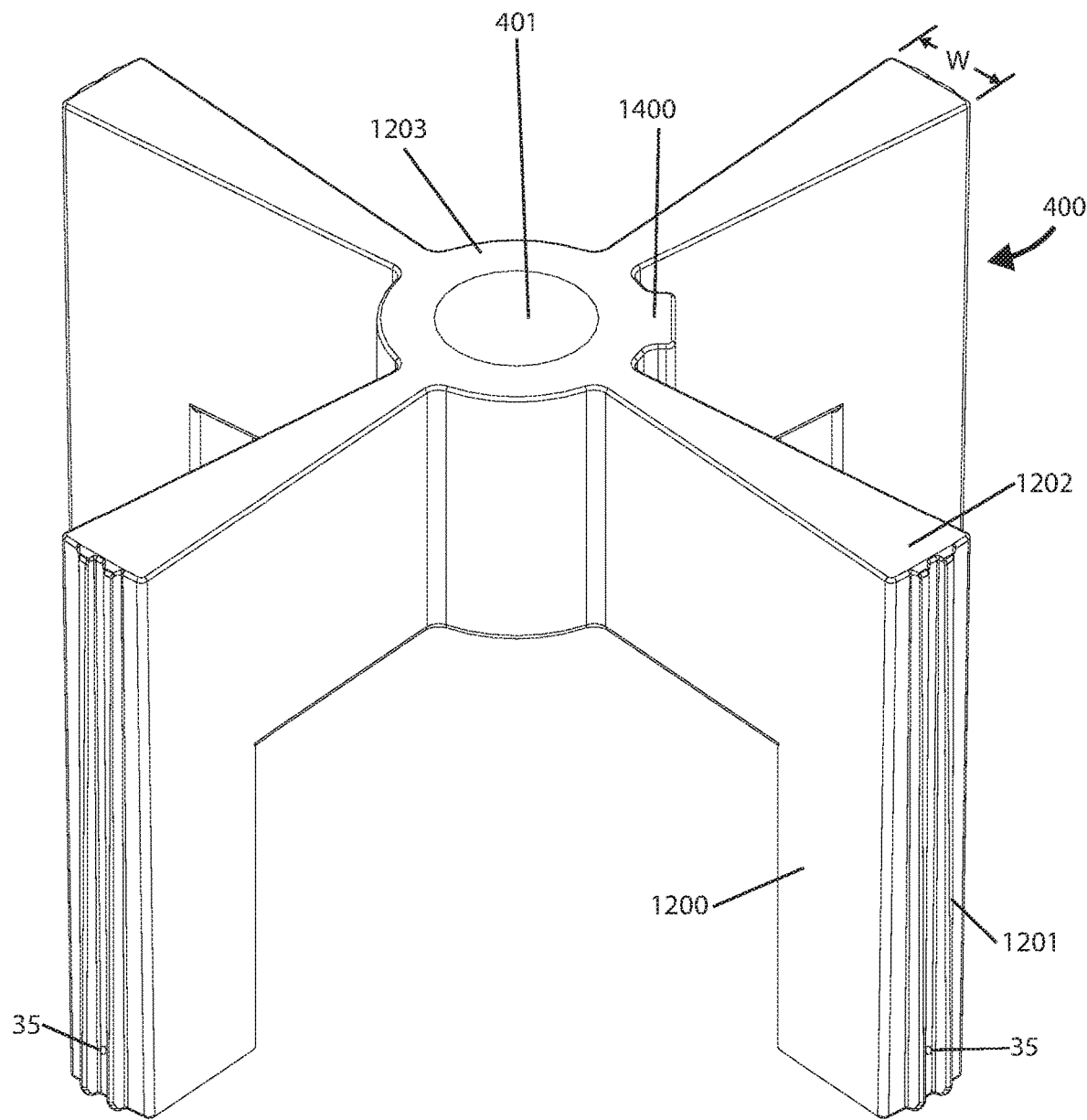
FIG. 12 is a top perspective view of the stand shown in FIG. 4A.
Figure 13:
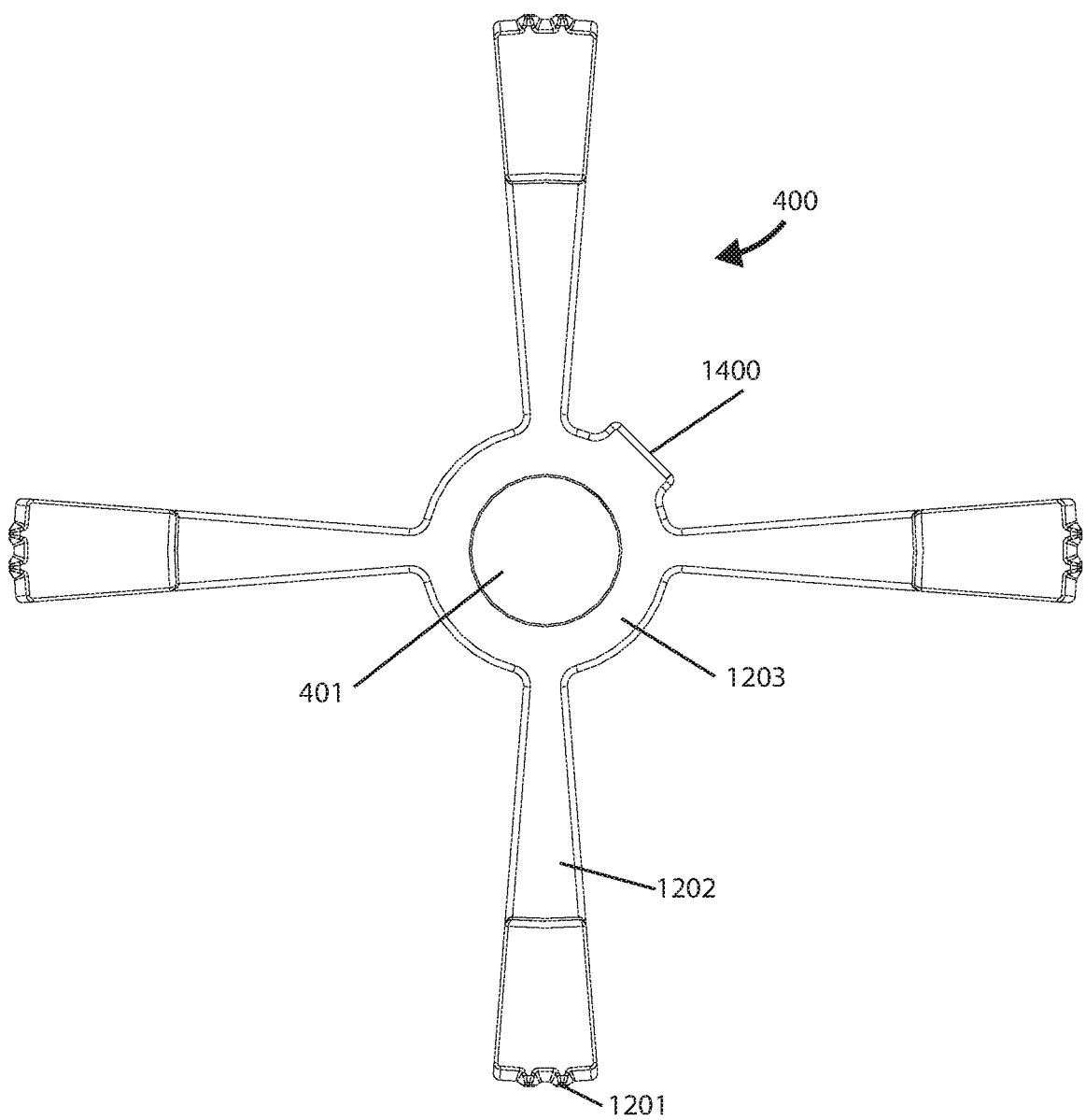
FIG. 13 is a top plan view of the stand shown in FIG. 12.
Figure 14:
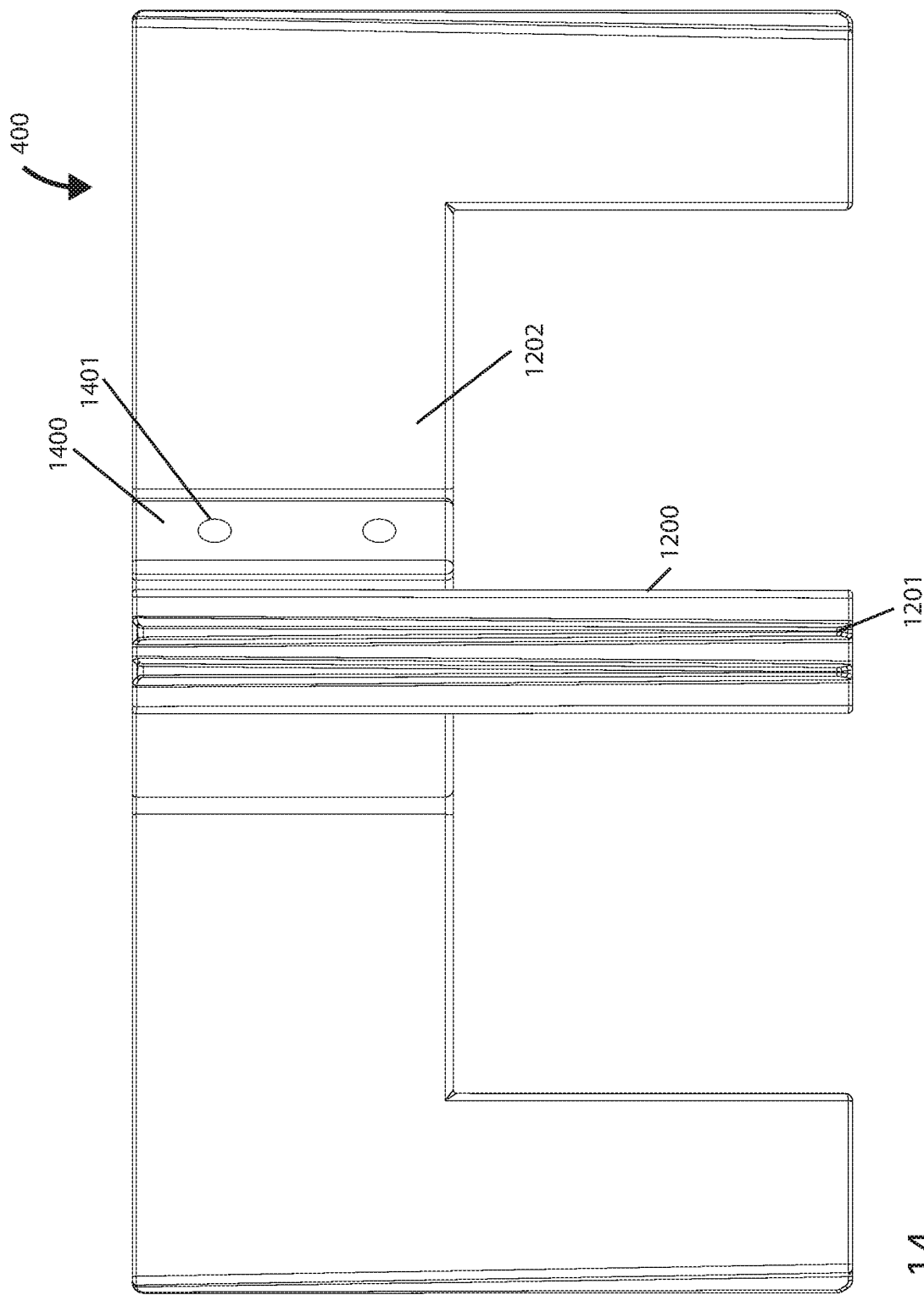
FIG. 14 is a front elevation view of the stand shown in FIG. 12.
Figure 15:
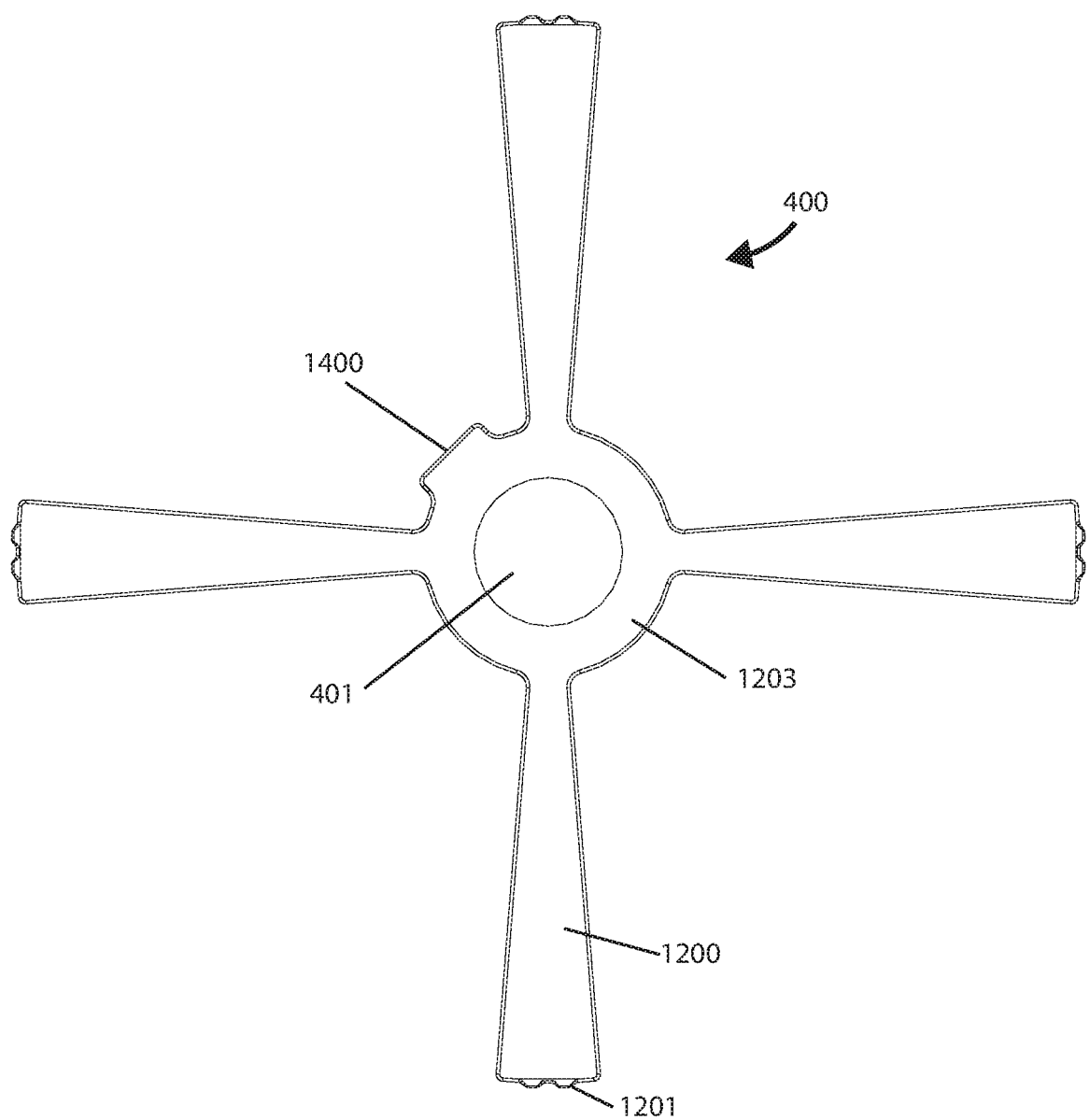
FIG. 15 is a bottom plan view of the stand shown in FIG. 12.

In FIG. 9 the flapper 900 has a thick base with D90=¼ to ⅜ inch. Fixtures 901 hold the pivot arms 8050. The rod 502 moves up and down in hole 902. In all embodiments the pivot arms could be metal instead of plastic.

Figure 10:
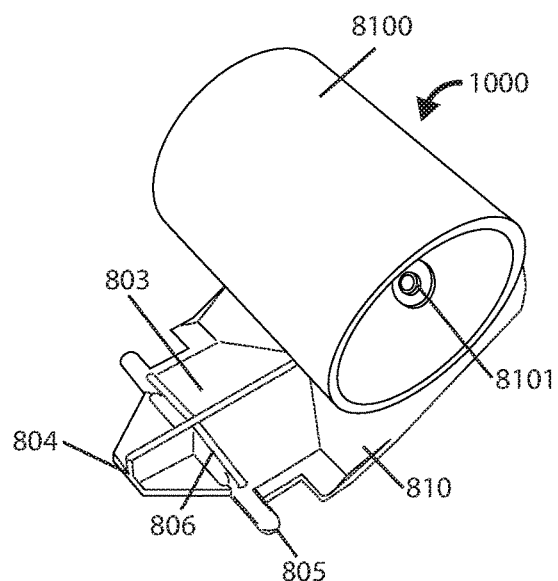
FIG. 10 is a top perspective view of a training paddle.

Referring next to FIG. 10 a training flapper 1000 has a removable riser 8100 shaped as a cylinder. A nut and bolt 8101 attaches the riser 8100 to the tongue 810. The animal gets used to depressing the tongue 810 with less insertion of his nose into the bowl.

Figure 11:
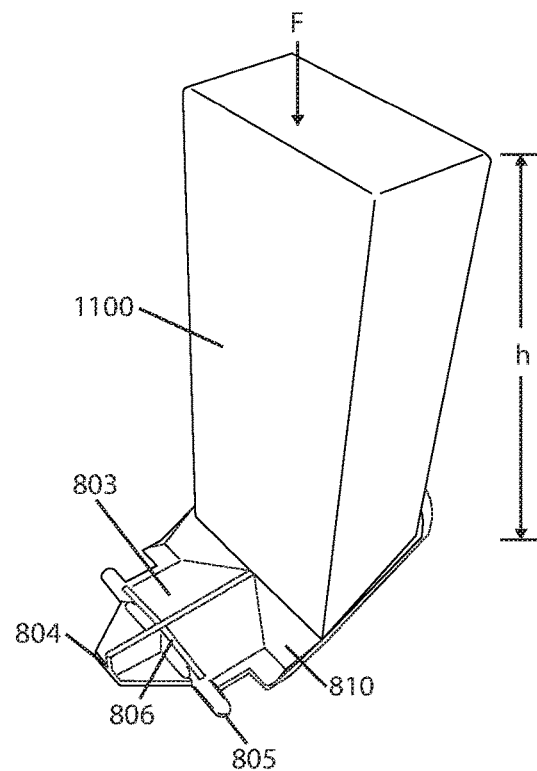
FIG. 11 is a top perspective view of a paddle for short nosed animals such as sheep.

Referring next to FIG. 11 the riser 1100 is used to raise the tongue 810 a height h above the bottom of the bowl. This allows sheep, goats or other animals to activate the tongue 810.

Referring next to FIGS. 12-15 the stand 400 is the preferred way to stabilize the male threaded outlet port 18 shown in FIG. 4A. A central hub 1203 forms the hole 401 for the pipe extension 30 shown in FIG. 4A. Support arms 1202 taper outbound to a widest width W. Each leg 1200 has outer ridges 1201 to nest against the inside of outer pipe 11. For installation the pipe extension 30 is mounted above the leech field 4. Next the stand 400 is set onto the pipe extension 30. Next the outer pipe 11 is placed over the stand 400. Next the valve assembly 150 is placed down the outer pipe 11 and screwed onto the male threaded outlet port 18. The hub extension 1400 has mounting holes 1401 used for set screws to secure the extension pipe 30. The FIG. 12 hole 35 is for fastener 35 shown in FIG. 3.

Figure 16:
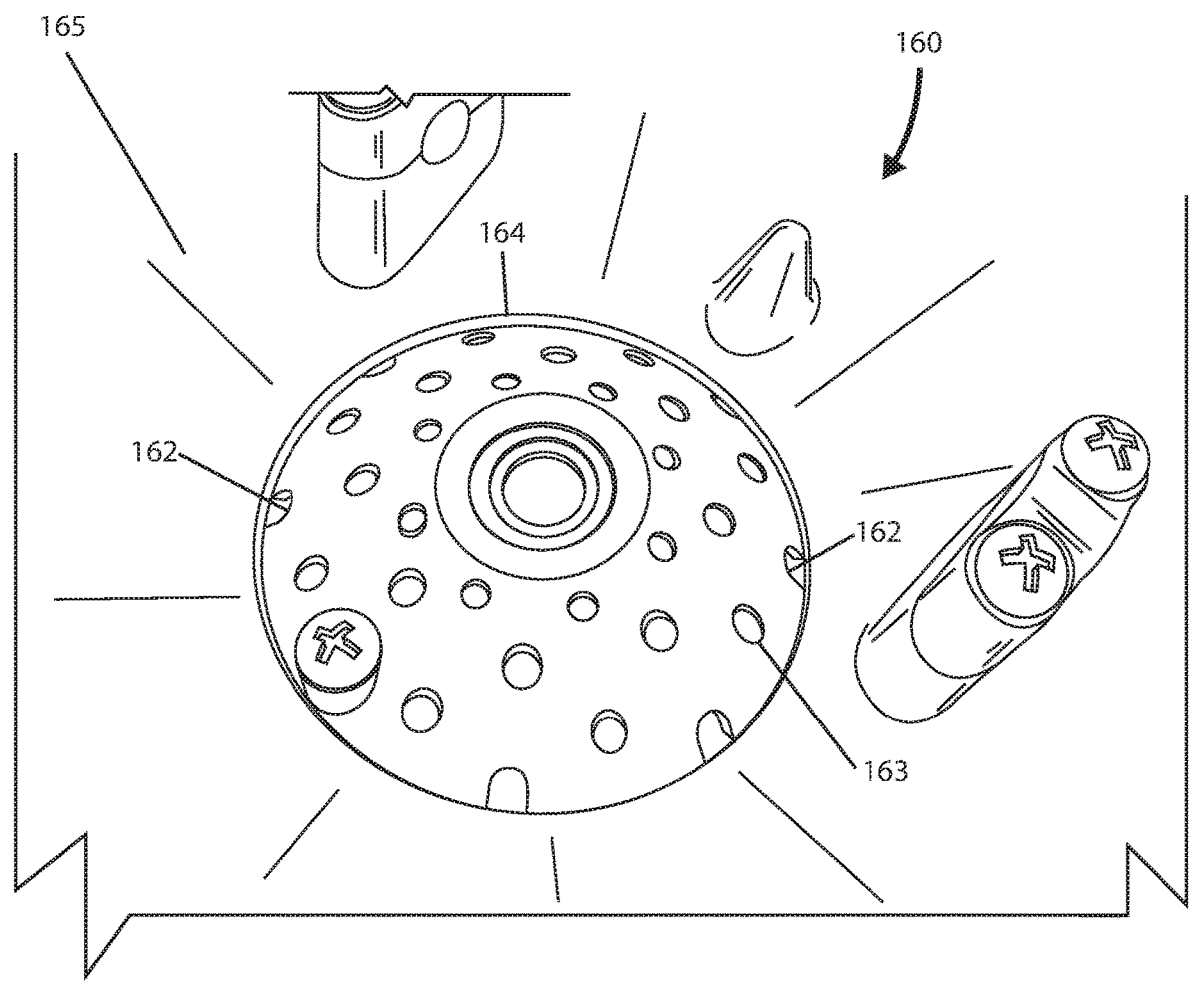
FIG. 16 is a top perspective view of an improved drain filter.

Referring next to FIG. 16 the circular bowl is designated 165. The central drain hole 164 is sized to allow the drain filter 160 to drop slightly below the bottom surface of the bowl. This allows all water to drop down into the peripheral holes 162 of the drain filter 160. Traditional drain holes 163 are also included.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. An animal watering fountain comprising:
   a water holding basin;
   vertical support means for said basin comprising a tubular member having a coaxial water-carrying conduit therein and where an annular interspace is defined between the tubular member and the conduit, and wherein the conduit is in communication with the interior of the water holding basin;
   a source of water from a vertically oriented pipe having a male threaded outlet port;
   first valve means interconnecting the conduit and the source of water;
   a reciprocable actuator rod attached to the first valve means and disposed within the conduit;
   a depressible lever pivotally mounted within the basin and in operable contact with the actuator rod;
   at least one opening in a lower portion of the tubular member establishing communication between the annular interspace and the outside of the tubular member
   said first valve means having a bottom end;
   a stand at a bottom of the tubular member;

said stand having a central hub to stabilize the male threaded outlet port at least about four inches above the bottom of the tubular member; and said bottom end of the first valve means having a female threaded port for the male threaded outlet port.

2. The fountain of claim 1, wherein the depressible lever further comprises a pivot axle and a tongue supported by a reinforced central base which has a thickness at least about two times that of the tongue.

3. The fountain of claim 2, wherein the water holding basin further comprises a bowl having inner vertical ribs and a connection to the coaxial water-carrying conduit.

4. The fountain of claim 3, wherein the tongue further comprises a riser to raise a contact point within the water holding basin.

5. The fountain of claim 1, wherein the depressible lever further comprises a riser attachment to raise a contact point within the water holding basin.

6. An animal watering fountain comprising:
an outer pipe mountable under a ground surface to provide a bowl at its top accessible by an animal above the ground surface;
said bowl connected to a coaxial inner water carrying conduit which has an activation rod therein;
said activation rod activated by an animal pushing down on a pivotable flapper in the bowl;
a normally closed release valve located at a bottom of the inner water carrying conduit and opened by the activation rod; and
a stabilizing means located at a bottom of the outer pipe functioning to maintain a male threaded outlet port vertically at least about four inches above a bottom of the outer pipe.

7. The fountain of claim 6, wherein the stabilizing means further comprises a stand having a central hub to secure the male threaded outlet port.

8. The fountain of claim 7, wherein the stand further comprises four legs, each having ridges to contact an inner periphery of the outer pipe.

9. The fountain of claim 6, wherein the stabilizing means further comprises a block located at the bottom of the outer pipe and having a central guide for maintaining the male threaded outlet port at least about four inches above a bottom of the outer pipe.

10. The fountain of claim 6, wherein the stabilizing means further comprises a guide plate mounted across and inner and lower section of the outer pipe and having a central hole to maintain the threaded outlet port at least about six inches above a bottom of the outer pipe.

11. The fountain of claim 6, wherein the pivotal flapper further comprises a reinforced axis of pivot and a tongue rising from the reinforced axis of pivot.

12. The fountain of claim 11, wherein the bowl further comprises a plurality of inner vertical side ribs.

13. The fountain of claim 6, wherein the bowl further comprises a bottom drain hole that receives a drain filter with peripheral drain holes located below a top edge of the bottom drain hole to prevent any buildup of water at the bottom of the bowl.

14. The fountain of claim 6, wherein the pivotal flapper further comprises a partial circular base with a thickness of about ¼ to about ⅜ inch, the base having integral pivot arms and a central hole.

\* \* \* \* \*